United States Patent
Lin et al.

(10) Patent No.: US 6,865,434 B1
(45) Date of Patent: Mar. 8, 2005

(54) MANAGEMENT SYSTEM OF MONITOR WAFERS

(75) Inventors: Chun-Nan Lin, Hsin-Chu (TW); Ming-Yu Liu, Chang-Hua Hsien (TW); Chia-Ping Yang, Taipei (TW); Shu-Yin Yang, Hsin-Chu Hsien (TW); Cho-Ching Ko, Hsin-Chu (TW)

(73) Assignee: Powerchip Semiconductor Corp., Hsin-Chu (TW)

( * ) Notice: Subject to any disclaimer, the term of this patent is extended or adjusted under 35 U.S.C. 154(b) by 0 days.

(21) Appl. No.: 10/707,626

(22) Filed: Dec. 25, 2003

(30) Foreign Application Priority Data

Jul. 30, 2003 (TW) ........................................ 92120907 A

(51) Int. Cl.[7] .............................................. G06F 19/00
(52) U.S. Cl. ........................... 700/108; 700/80; 700/91; 700/95; 700/100; 700/109; 700/121; 705/28
(58) Field of Search .............................. 700/90, 91, 95, 700/96, 100, 103, 108, 109, 121, 79, 80; 718/100, 102; 707/1, 200; 705/22, 28

(56) References Cited

U.S. PATENT DOCUMENTS 5,940,300 A * 8/1999 Ozaki ........................ 700/121
6,338,005 B1 * 1/2002 Conboy et al. ............. 700/121

* cited by examiner

Primary Examiner—Leo Picard
Assistant Examiner—Charles Kasenge
(74) Attorney, Agent, or Firm—Winston Hsu

(57) ABSTRACT

A management system for managing information of monitor wafers stored in a storage center includes an operation rule module for determining the next manufacturing process for each of the monitor wafers according to its wafer number and wafer condition, an information update module for updating the information of the monitor wafers in a database according to the results made by the operation rule module, an inventory module for computing an inventory quantity of the monitor wafers according to the wafer numbers and the wafer conditions of the monitor wafers, a warning module for checking whether the inventory quantity of the monitor wafers is less than the quantity of the safety stock or not and sending a warning message when the inventory quantity of the monitor wafers is less than the quantity of the safety stock, and a display module for showing the wafer conditions and the inventory quantity of the monitor wafers.

6 Claims, 2 Drawing Sheets

MANAGEMENT SYSTEM OF MONITOR WAFERS

BACKGROUND OF INVENTION

1. Field of the Invention

The present invention relates to a management system of monitor wafers, and more particularly, to a management system capable of automatically computing a reasonable inventory quantity of monitor wafers and automatically checking whether the inventory quantity is within a safety stock quantity or not.

2. Description of the Prior Art

In order to control the quality of integrated circuits, a so-called monitor wafer is used to ensure the quality of the wafers made in one wafer manufacturing process. That is, upon the completion of a wafer manufacturing process, the monitor wafers would be sent to the quality control department for quality testing; and according to the testing result, the operators decide whether the next manufacturing process or the present process should be performed on these wafers. However, the used monitor wafers have to go through a series of recycling processes before they can go back to the wafer production process. Besides, the monitor wafers used in different wafer manufacturing processes can substitute each other, under the condition that a wafer in one wafer manufacturing process has to go through a series of pretreatment processes before it can be used to replace the monitor wafer used in a different wafer manufacturing process. For example, the pretreatment processes need to find out the types and the quantities of the substitute monitor wafers that can be assigned to replace certain kind of monitor wafers. According to the demand quantity of the monitor wafers to be replaced and the available quantity of the substitute monitor wafers, certain substitute monitor wafers are assigned to replace the monitor wafers used in a different wafer manufacturing process.

A conventional management method of monitor wafers is to store the monitor wafers in a storage center. The operators have to inform the storage center of their demand quantities of the monitor wafers and then get the monitor wafers from the storage center. In addition, the monitor wafers passed predetermined manufacturing processes and tests are collected in a recycle box and sent back to the storage center so as to take recycling processes. In this case, the storage center has to periodically calculate an inventory quantity of the monitor wafers and check whether the inventory quantity can satisfy the demand quantities from the manufacturing processes and maintain a safety stock. If the inventory quantity of the monitor wafers is found less than the quantity of the safety stock, the storage center has to buy new monitor wafers to avoid affecting the wafer production processes.

However, the conventional management method of monitor wafers cannot calculate an accurate value for the inventory quantity of the monitor wafers. For example, when the storage center finds that the inventory quantity of the monitor wafers is going to be less than the quantity of the safety stock, it may determine to order new monitor wafers to replenish the stock. Sometimes when the storage center-has just finished the replenish procedures or the store center is executing the replenish procedures, the used monitor wafers or the recycled monitor wafers are sent back to the storage center too. Since these used monitor wafers or recycled monitor wafers are enough to satisfy the quantity of the safety stock, the new monitor wafers only bring excess stock and unnecessary costs to the storage center instead. Because it is difficult of using the conventional management method to get enough information of the in-line monitor wafers, such as the in-line wafer conditions and the wafer quantities, the storage center cannot distinguish the qualities of the recycled monitor wafers or estimate a reasonable processing time required for these recycled monitor wafers to undergo the recycling processes. In other words, it becomes very difficult for the storage center to predict a reasonable inventory quantity of the monitor wafers or even to simplify the recycling processes of some of the recycled monitor wafers according to their wafer conditions, thus resulting in waste of production costs.

SUMMARY OF INVENTION

It is therefore an object of the claimed invention to provide a management system for managing information of monitor wafers to achieve advantages of automatically computing a reasonable inventory quantity of the monitor wafers and automatically checking whether the inventory quantity of the monitor wafers is within a safety stock quantity or not.

It is another object of the claimed invention to provide a management system for managing information of monitor wafers to achieve advantages of tracking utilizing records of the monitor wafers to effectively control the current wafer conditions.

It is still another object of the claimed invention to provide a management system for managing information of monitor wafers to achieve advantages of defining process flows for the monitor wafers to improve their utility and reduce production costs.

According to the claimed invention, the management system for managing information of monitor wafers stored in a storage center includes an operation rule module for determining the next manufacturing process for each of the monitor wafers according to its wafer number and wafer condition, an information update module for updating the information of the monitor wafers in a database according to the results made by the operation rule module, an inventory module for computing an inventory quantity of the monitor wafers according to the wafer numbers and the wafer conditions of the monitor wafers, a warning module for checking whether the inventory quantity of the monitor wafers is less than the quantity of the safety stock or not and sending a warning message when the inventory quantity of the monitor wafers is less than the quantity of the safety stock, and a display module for showing the wafer conditions and the inventory quantity of the monitor wafers.

It is an advantage of the present invention that the management system gives each of the monitor wafers a wafer number and controls the information of each of the monitor wafers according to its wafer number. Therefore, it is very convenient for the management system to use the operation rule module to determine the next manufacturing process for each of the monitor wafers according to its utilizing condition and use the inventory module to automatically calculate a reasonable invention quantity of the monitor wafers. As a result, the advantages of tracking the wafer conditions, controlling the wafer conditions, improving abilities of quality controls on the monitor wafers, and automatically checking the inventory quantity of the monitor wafers can be achieved by the management system of the present invention. In addition, the present invention also allows clients to connect to the management system to define process flows of the monitor wafers and store them in the database. The operation rule module is capable of determining the manufacturing process for each of the monitor wafers according to its defined process flow, thus improving utility of each of the monitor wafers and reducing production costs.

These and other objects of the claimed invention will be apparent to those of ordinary skill in the art after reading the following detailed description of the preferred embodiment that is illustrated in the various figures and drawings.

DETAILED DESCRIPTION

Figure 1:
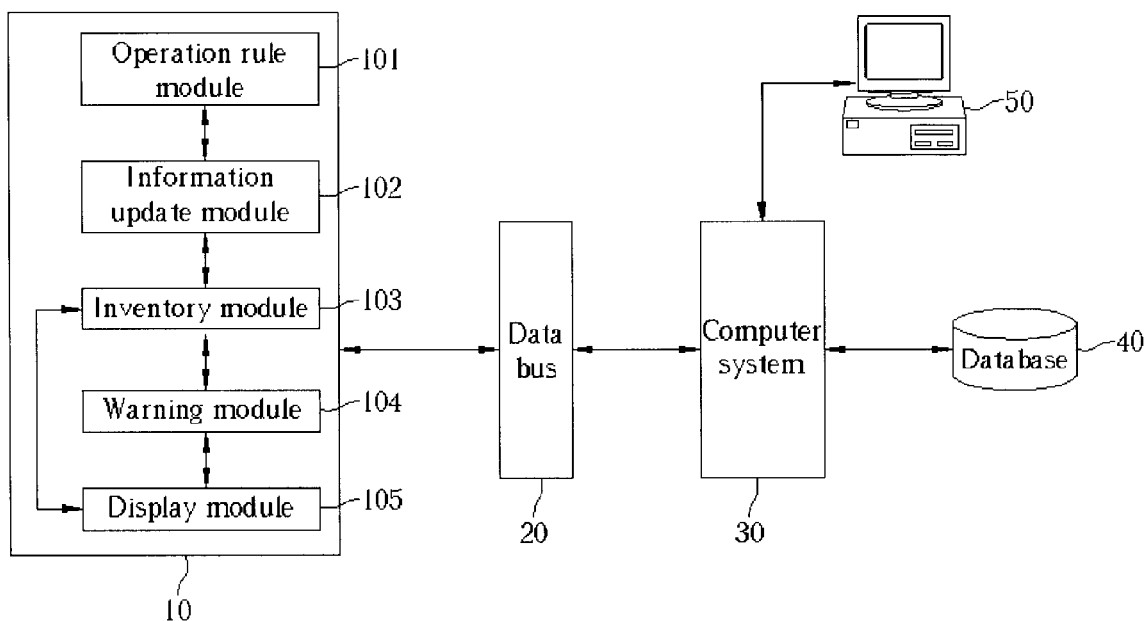
FIG. 1 is a function block diagram of a management system of monitor wafers according to the present invention.

Referring to FIG. 1 of a function block diagram of a management system of monitor wafers according to the present invention, a management system 10 is used to manage information of monitor wafers stored in a storage center. The information of the monitor wafers includes various specifications, such as the particle amount, resistance, thickness, metal content and costs, to be applied in either new monitor wafers or recycled monitor wafers used in various semiconductor processes. In order to effectively control the information of the monitor wafers, the storage center gives each of the monitor wafers an individual wafer number and store these wafer numbers into a database 40 connected to the management system 10.

As shown in FIG. 1, the management system 10 includes an operation rule module 101 for determining the next manufacturing process for each of the monitor wafers according to its wafer number and wafer condition; an information update module 102 for updating the information of the monitor wafers in the database 40 according to the results made by the operation rule module 101; an inventory module 103 for computing an inventory quantity of the monitor wafers according to the wafer numbers and the wafer conditions of the monitor wafers; a warning module 104 for checking whether the inventory quantity of the monitor wafers is less than the quantity of the safety stock or not, and sending a warning message when the inventory quantity of the monitor wafers is less than the quantity of the safety stock; and a display module 105 for showing the wafer conditions and the inventory quantity of the monitor wafers.

According to the individual wafer number of each of the monitor wafers, the management system 10 is capable of obtaining the wafer information corresponding to the wafer number from the database 40, and using the modules of the management system 10 to determine the next manufacturing process of the monitor wafer, check the inventory quantity of the monitor wafers in the storage center, and update the wafer information in the database 40. In a better embodiment of the present invention, the connection between the management system 10 and the database 40 is built through a data bus 20 and a computer system 30. When accessing the wafer information corresponding to certain wafer number, the management system 10 uses the data bus 20 and the computer system to obtain the wafer information from the database 40. When updating the wafer information, the management system 10 still uses the data bus 20 and the computer system 30 to store the wafer information into the database 40.

Normally, when the storage center obtains new monitor wafers, the operators have to build information of the new monitor wafers in the database 40, such as the component materials, the types of the substitute monitor wafers and the corresponding wafer numbers. After the monitor wafers are used in different semiconductor processes, the operators also need to update the information of the monitor wafers in the database 40, so as to correspond the wafer information to the current in-line wafer conditions. For example, the computer system 30 may further comprise a server to enable the operators to use a client computer 50 (such as a personal computer or a personal digital assistant) to connect to the computer system 30 through the Internet or the Intranet. Under this connection, the operators are allowed to store the information of the monitor wafers, such as the equipments, the semiconductor processes and the processing time that the monitor wafers have been passed through, into the database 40. The used monitor wafers are then collected in a recycle box and sent back to the storage center according to correlated recycling rules. Following that, the next manufacturing process for each of the recycled monitor wafers that are sent back to the storage center is determined by the operation rule module 101.

Since the information of the monitor wafers stored in the database 40 is anytime updated to correspond to the current wafer condition of each of the monitor wafers, the management system 10 is capable of providing the client 50 to connect to the computer system 30 to search for the current in-line wafer information from the database 40, or define management conditions of the monitor wafers in the database 40. For example, the client 50 has to verify his access permission after he connects to the computer system 30. After he passes the access permission verification, he is allowed to define process flows for the monitor wafers, for example define the types and schedules for the monitor wafers to go through certain semiconductor processes according to an assigning rule of the monitor wafers, and store these settings into the database 40. As a result, the operation rule module 101 is capable of determining the process steps of the monitor wafers according to these process flow settings. In addition, the client 50 may further set up a predetermined period for the warning module 104 to periodically track the current inventory quantity of the monitor wafers and see whether it satisfies the quantity of the safety stock or not. The client 50 may also set up a predetermined period for the warning module 104 to periodically check the utilizing condition of each of the monitor wafers and see whether it corresponds to its process flow definition or not. These tracking results and checking results are stored into the database 40 according to the present invention. Furthermore, these results can be transmitted to the client 50 through a message server (not shown) connected to the display module 105, thus facilitating the client 50 to control the information of the monitor wafers such as the inventory quantity of the monitor wafers or the current wafer conditions. In other words, when the management system 10 finds the tracking results indicate the inventory quantity of the monitor wafers is or is going to less than the quantity of the safety stock, the message server sends messages to inform associated persons to start the procedures of replenishing the stock. When the management system 10 finds the checking results indicate certain monitor wafer is not used according to its process flow definition, the message server also sends messages to inform associated persons to deal with the problems of the certain monitor wafer, so as to improve its utility.

Figure 2:
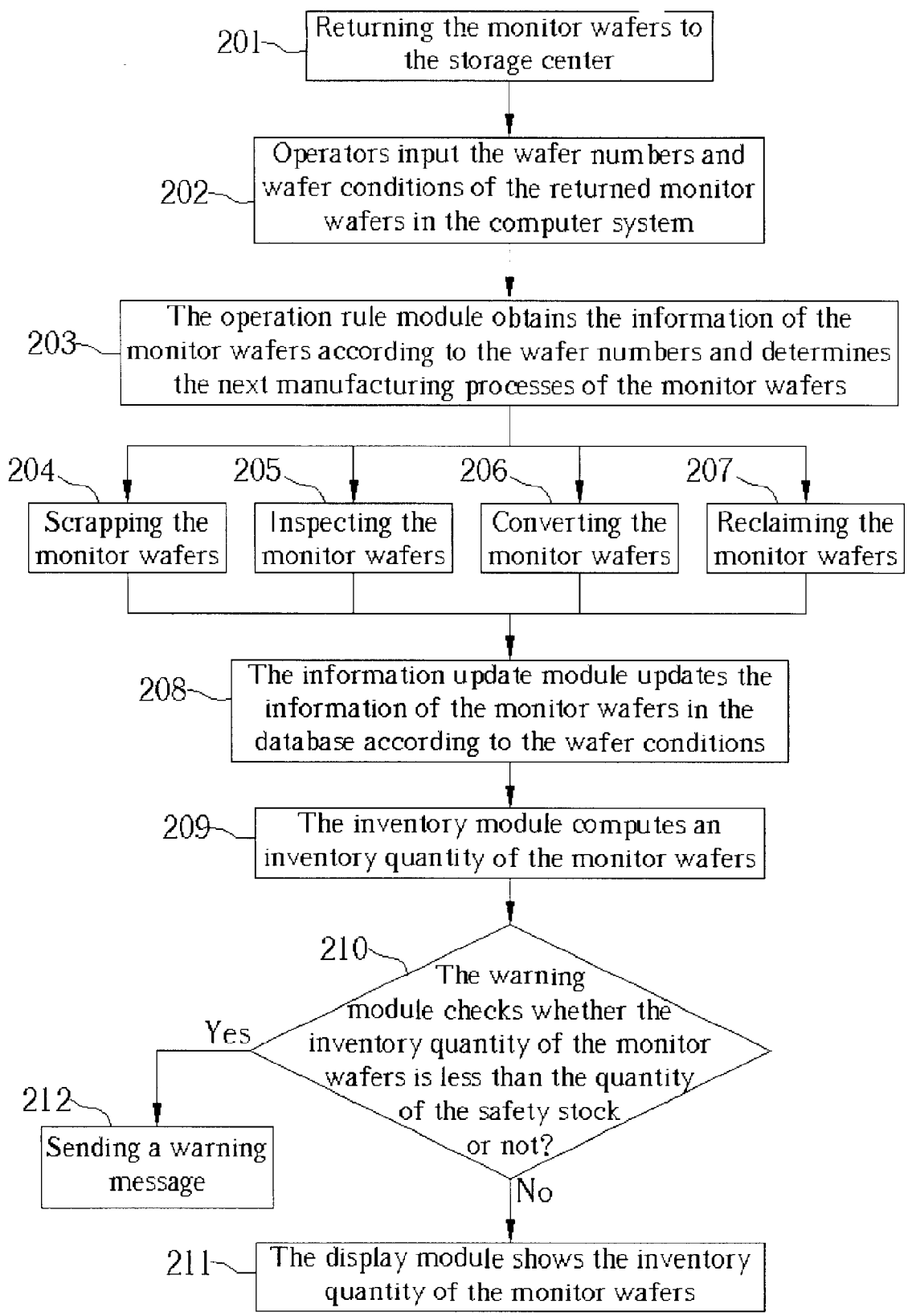
FIG. 2 is a flow chart for a management system of monitor wafers to recycle used monitor wafers according to the present invention.

Referring to FIG. 2, which is a flow chart for a management system of monitor wafers to recycle used monitor wafers according to the present invention. This flow chart illustrates the recycling procedures taken by the management system 10 to deal with the information of the used monitor wafers sent back to the storage center. However, the management system 10 is not limited to deal with the information of the recycled monitor wafers, it also can be applied in dealing with the information of the in-line monitor wafers or new monitor wafers. As shown in FIG. 2, a step 201 is performed to return the used in-line monitor wafers to the storage center. When the monitor wafers are sent back to the storage center, a step 202 is thereafter performed by the operators to connect to the computer system 30 to input the wafer numbers and the wafer conditions (recycling) of the returned monitor wafers, so as to find out the process flow of each of the monitor wafers from the database 40. Subsequently, in a step 203, according to the inputted wafer numbers and the wafer conditions, the operation rule module '101 obtains the information of the monitor wafers from the database 40 and determines the next manufacturing processes of the monitor wafers. For example, the operation rule module 101 may determine the recycled monitor wafers should follow a step 204 to be scrapped, a step 205 to be inspected in an inspecting equipment, a step 206 to be converted to other manufacturing processes and temporarily stored in the storage center, or a step 207 to be reclaimed depending on the wafer rules (wafer process flows).

Following that, in a step 208, the information update module 102 updates the information of the monitor wafers in the database 40 according to the manufacturing processes determined by the operation rule module 101. A step 209 is then performed by the inventory module 103 to calculate the current inventory quantity of the monitor wafers according to the updated wafer information. Subsequently, a step 210 is performed by the warning module 104 to check whether the inventory quantity of the monitor wafers calculated in the step 209 is less than the quantity of the safety stock or not. If the inventory quantity of the monitor wafers is higher than the quantity of the safety stock, then go to a step 211 to show the inventory quantity of the monitor wafers by the display module 105. If the inventory quantity of the monitor wafers is less than the quantity of the safety stock, then go to a step 212 to use the message server to send warning messages to inform associated persons to start the procedures of buying new monitor wafers to replenish the stock of the monitor wafers.

The management system of the present invention provides functions of updating and storing the utilizing records of each of the monitor wafers, and further using these records to effectively control the inventory quantity of the monitor wafers. In other embodiments of the present invention, similar management systems can also be provided to manage product information. For example, a management system for managing information of wafers can be used to record each manufacturing process that a wafer goes through. According to the record, the system is capable of obtaining the current wafer condition and analyzing the wafer condition, thus facilitating controls of the wafer inventory quantity or estimations of production yields.

In contrast to the prior art, the management system of the present invention provides the advantages of:

(1) automatically calculating and checking the inventory quantity of the monitor wafers;

(2) defining complete process flows of the monitor wafers;

(3) controlling the manufacturing processes that the monitor wafers go through;

(4) automatically checking the wafer conditions stored in the database with the current wafer conditions;

(5) effectively controlling the total inventory quantity of the monitor wafers of the company, including the wafer stock and the in-line wafers;

(6) collecting complete information of the monitor wafers;

(7) effectively controlling the current conditions of the monitor wafers;

(8) improving the utility of the monitor wafers and reducing the production costs; and (9) improving abilities of quality controls on the monitor wafers.

Those skilled in the art will readily observe that numerous modifications and alterations of the system may be made while retaining the teachings of the invention. Accordingly, the above disclosure should be construed as limited only by the metes and bounds of the appended claims.

What is claimed is:

1. A management system for managing information of monitor wafers stored in a storage center, each of the monitor wafers comprising a wafer number, the information of each of the monitor wafers being stored in a database, the management system comprising:

an operation rule module for determining the next manufacturing process for each of the monitor wafers according to its wafer number and wafer condition;

an information update module for updating the information of the monitor wafers in the database according to the results made by the operation rule module;

an inventory module for computing an inventory quantity of the monitor wafers according to the wafer numbers and the wafer conditions of the monitor wafers;

a warning module for checking whether the inventory quantity of the monitor wafers is less than the quantity of the safety stock or not and sending a warning message when the inventory quantity of the monitor wafers is less than the quantity of the safety stock; and a display module for showing the wafer conditions and the inventory quantity of the monitor wafers.

2. The management system of claim 1 wherein the management system is connected to a data bus, and the information of the monitor wafers is transmitted from the data bus to a computer system that is used to control the database, so as to be stored in the database.

3. The management system of claim 2 wherein the computer system is capable of providing connection with at least a client to enable the client to use the computer system to define a process flow of each of the monitor wafers and store the process flow in the database, thus each of the monitor wafers can be used according to its process flow and the wafer condition of each of the monitor wafers can be tracked and compared with its process flow.

4. The management system of claim 2 wherein the computer system is capable of providing connection with at least a client to enable the client to use the computer system to update the in-line information of each of the monitor wafers and transmit the information to the management system.

5. The management system of claim 2 wherein the computer system is capable of providing connection with at least a client to enable the client to use the computer system to access the management system and search for the wafer condition of each of the monitor wafers and the inventory quantity of the monitor wafers.

6. The management system of claim 1 wherein the warning module is capable of periodically checking the inventory quantity of the monitor wafers according to a predetermined period defined in the database.

* * * * *